UNITED STATES PATENT OFFICE.

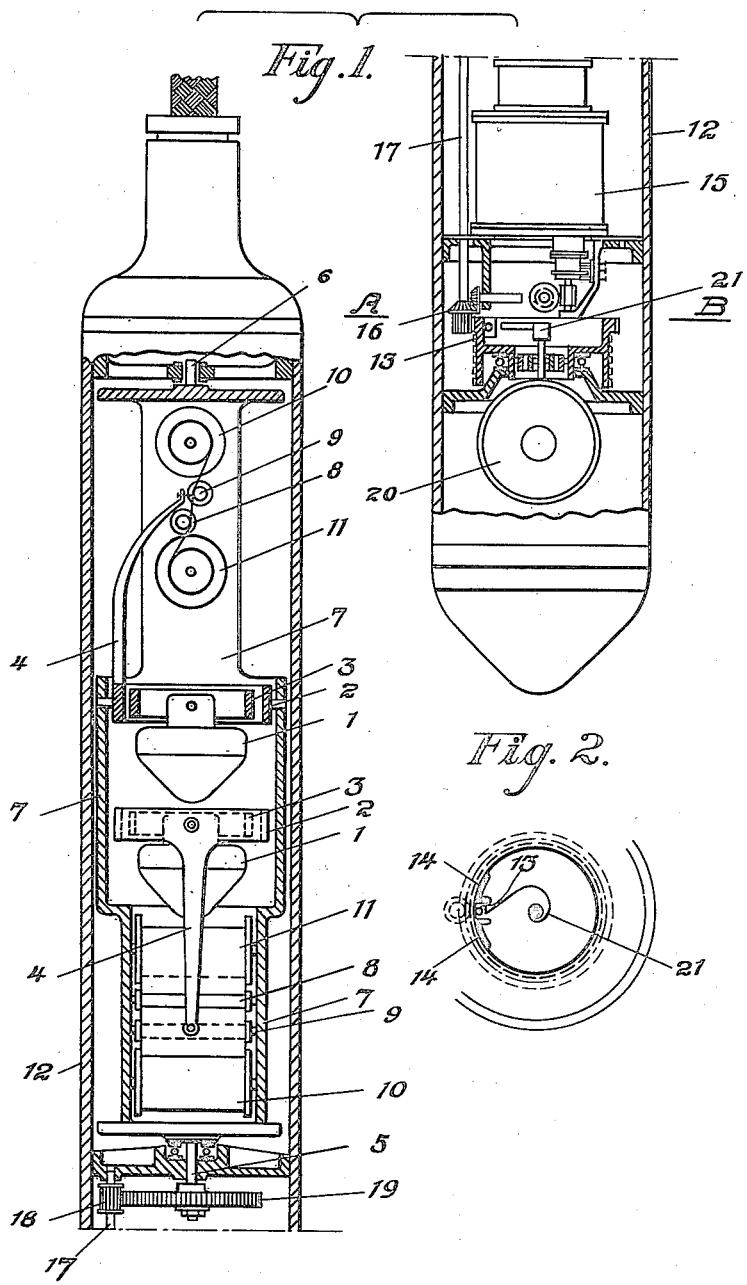

FRITZ NEUROTH, OF BRUCKHAUSEN, HAMBORN, GERMANY.

DECLINATION-RECORDER FOR BORE-HOLES.

1,215,840.

Specification of Letters Patent.

Patented Feb. 13, 1917.

Application filed December 19, 1914. Serial No. 878,181.

*To all whom it may concern:*

Be it known that I, FRITZ NEUROTH, a subject of the Emperor of Austria-Hungary, and resident of Bruckhausen, Kasinostrasse 2, town of Hamborn, Germany, have invented certain new and useful Improvements in Declination-Recorders for Bore-Holes, of which the following is a specification.

This invention relates to improvements in apparatus for measuring the declination from the perpendicular, particularly in drilling holes.

Apparatus for determining the extent and the direction of declinations from the perpendicular, are of particular importance in the construction of shafts. With the steady development of the freezing process for shafts of great depth, it has become highly important to ascertain the position of the freezing holes, one below the other, with the utmost accuracy, even very small mistakes in this direction causing at great depths serious differences in the actual location of the freezing holes.

Accuracy is also of great importance in the subsequent delineation of the different soundings and measurements taken, in order to ascertain the general location of the freezing holes, and on account of the customary repeated transfer of the declinations and angles shown by the apparatus, the general and actual declination of the drilling holes will always be drawn inaccurately.

The apparatus described hereinafter will avoid the calculation and transfer of the angles and will ascertain in a very simple way, but with the greatest accuracy, the total declination of the drilling hole. These two conditions will be carried out by the apparatus of this invention, as it resolves the declination into components at right angles to each other, and the dividing into these components is based on a system of axis which remains unchangeable with respect to the bearings of the compass.

The invention makes use of well known pendulum devices, having Cardan rings which are provided with two equal levers. At a certain inclination of the apparatus, these levers of the Cardan rings will swing exactly defined amounts in two directions perpendicular to each other, the resultant of which corresponds exactly to the amplitude and direction of the hanging of the pendulum compared with the perpendicular. This pendulum suspension which is provided with the levers is influenced by a directing force in such a way that the suspension of the pendulum once adjusted is not rigid with the casing of the apparatus, which may turn upon its vertical axis, but the suspension of the pendulum is independent of this uncertain rotation and by a suitable directing power to be described, is always maintained in its initial normal position with respect to the compass bearing, during the whole operation of taking the soundings. The components shown by the levers will therefore indicate not only the exact amplitudes but also the actual directions of the inclinations of the apparatus with respect to the invariable coördinate system.

In the drawings,

Figure 1 is a vertical sectional view of the device;

Fig. 2 is a cross sectional view on the line A—B of Fig. 1.

The apparatus is equipped with two pendulums 1, which are rigidly connected with the inner of the two Cardan rings 2 and 3, and thus will always hang perpendicular, independent of the position of the apparatus.

To the outside rings 2 are attached arms 4, the free ends of which carry recording arrangements. The outside rings 2 are placed in the casing 7 of the recorder in such a way that they may swing, and that the recording arms are only able to move in one direction with respect to the casing. The two arms as well as the appertaining rings are arranged in such a way that the moving directions of the recording arms will be perpendicular to each other. Thus in case of an inclination of the apparatus at least one of these arms would always deviate from its normal perpendicular position.

The casing 7 of the recorder, which is held by means of the journals 5 and 6, will participate in the inclination of the apparatus thus making a movement relatively to at least one of the writing arms. This movement is used for registering the extent of the inclination, as follows:

Paper straps or tapes stretched between the tension pulleys 8 and 9 and the winding rollers 10 and 11, are set in movement parallel to the longitudinal axis of the apparatus, and the writing levers 4, which are provided with pencils, will make the drawings on the paper. Any inclination will therefore be resolved into two components perpendicular to each other and separately recorded.

But considering that the outside casing 12 of the apparatus can rotate more or less when it is let down suspended on a rope, the recorded components would not necessarily refer to the same coördinate system, but it would be necessary to take into consideration at times, the angle of rotary distortion upon the longitudinal axis.

In order to avoid such a complication, it is necessary that the position of the casing 7, containing the pendulums and the recording arrangements, should remain the same in regard to the distortion during the whole performance of the sounding. In the example shown, this is obtained by a device for reversing the casing 7 in accordance with the amount of rotation of the outside casing 12. This well known reversing device is operated by means of a gyroscope 20 as follows:

A contact ball 13 is placed with a small end play between two contact pieces 14 (see Fig. 2) and put in contact with the gyroscope body by a spiral spring 21. In this manner small distortions may of course occur between the reversing device and the gyroscope, but the contact ball 13 closes an electric circuit by means of which the reversible motor 15 is rotated in the one or the other direction, according as the ball 13 touches either the one or the other of the contact pieces 14. Motor 15 is fixed within outer casing 12 and its supply circuit includes the contacts 14. The return movement is equal in amount to the previous turning of the complete sounding apparatus, and is transferred to the casing 7 of the recorder by means of the bevel gears 16, the shaft 17 and the spur gears 18 and 19. Thus, by means of the gyroscope and the reversing device, the casing 7 of the recorder will upon rotation of the outer casing, always be returned to its initial position during the whole time of the sounding work. All declinations from the perpendicular will thus be recorded by two components, each standing at a right angle to the other, the direction of which with respect to the bearings of the compass, remains always the same.

The advantage of such an arrangement is obviously very great, as in summing up the dimensions of the individual components, furnishing when desired a drawing corresponding to the scale of the declinations from the same coördinate system, and the size and direction of the entire drilling hole is readily determined.

The troublesome transfer of angles will thus be avoided and the result of the extreme simplicity of the drawings will be greater accuracy and a considerable saving of time in the recording of results.

I claim:—

1. Apparatus for indicating the declination of bore holes and the like, comprising in combination means for resolving the declination into two components at right angles to each other, means for separately recording said components, and means for maintaining the resolving means in fixed normal position with respect to compass bearing.

2. Apparatus for indicating the declination of bore holes and the like, comprising in combination means for resolving the declination into two components at right angles to each other, means for separately recording said components, means adapted to remain in an assumed normal position with respect to compass bearings, and means governed thereby to effect a compensatory movement of the resolving means upon departure of the resolving means from normal position with respect to compass bearing.

3. Apparatus for indicating the declination of bore holes and the like, comprising in combination an outer casing, a record member suitably mounted therein, means for marking the declination upon said record member, and means for automatically moving said marking means circumferentially to compensate for circumferential movement of the said outer casing.

4. An apparatus for measuring the declination of the perpendicular, particularly in drilling holes, comprising an outer casing, an inner record casing independent of said outer casing, a plurality of pendulums, a plurality of Cardan rings connected with said pendulums and a plurality of recording members connected with said Cardan rings.

5. An apparatus for measuring the declination of the perpendicular, particularly in drilling holes, comprising an outer casing, an inner record casing mounted on a point bearing, a plurality of pendulums, a plurality of Cardan rings connected with said pendulums, a plurality of fingers each carrying a writing member at the outer end thereof and at the inner end connected to a Cardan ring, a reel of paper for receiving the markings of said fingers, a motor, a rolling electrical contact automatically connecting up said motor with the source of power, and a transmitting device connecting said motor and the means for determining the declination for maintaining the determining means in normal position with respect to compass bearing.

6. Apparatus for indicating the declination of bore holes and the like, comprising in combination means for resolving the declination into two components at right angles to each other, means for separately recording said components, and gyroscopic means for maintaining the resolving means in fixed normal position with respect to compass bearing.

Signed at the town of Cologne, Germany, this fifth day of November 1914.

FRITZ NEUROTH.

Witnesses:
   J. WYNEN,
   J. D. ZIESECKY.